Jan. 8, 1957  J. D. MINER, JR  2,777,081
ELECTRICAL BRUSH AND DYNAMOELECTRIC
APPARATUS EMBODYING THE SAME
Filed Oct. 7, 1955

WITNESSES
Edwin E. Bassler
Charles L. Board

INVENTOR
John D. Miner, Jr.
BY
Frederick Shoyer
ATTORNEY

United States Patent Office 2,777,081
Patented Jan. 8, 1957

2,777,081

ELECTRICAL BRUSH AND DYNAMOELECTRIC APPARATUS EMBODYING THE SAME

John D. Miner, Jr., Lima, Ohio, assignor to Westinghouse Electric Corporation, East Pittsburgh, Pa., a corporation of Pennsylvania Application October 7, 1955, Serial No. 539,132

4 Claims. (Cl. 310—228)

This invention relates to carbon brushes for dynamoelectric apparatus and dynamoelectric apparatus embodying such brushes.

It is well known that under certain various atmospheric conditions, such, for example, as exist at high altitudes where the water vapor pressure and oxygen pressure are low, that the carbon brushes employed on dynamoelectric apparatus wear and dust at an excessive rate so that the operation of the dynamoelectric apparatus may be serious impaired. Thus, at altitudes of 40,000 feet and higher where the air pressure may be less than 150 mm. of mercury and the moisture present may be so low that the dew point is —50° C. and lower, the operation of electrical motors and generators utilizing carbon brushes may be erratic or even cease functioning entirely because the carbon brushes wear rapidly and may dust away completely in a short period of time. In some instances, the brushes disintegrate so rapidly that a cloud of carbon dust surrounds the commutator or slip ring of the electrical machine and the brushes may be completely worn away in a few minutes operation.

Carbon brushes may be prepared with an admixture of certain metal halides such as disclosed in Patent No. 2,414,514 to Howard M. Elsey, and assigned to the same assignee as the present application. Brushes so prepared have been found to cooperate with the copper commutator so that excessive wear and dusting are greatly reduced to the extent that the brushes will operate satisfactorily for thousands of hours at high altitudes.

It has been discovered that, for the best operation of carbon brushes embodying metal halides, a prefilming operation is necessary. This prefilming operation consists in operating the carbon brush in contact with the freshly dressed metallic conducting surface for a substantial period of time of from the order of two to sixteen hours under conditions corresponding to normal oxygen and water vapor pressure present at the earth's surface.

It is known to include in carbon brushes other substances other than a metal halide serving to prolong the life of the carbon brush under conditions of low water vapor pressure and low oxygen pressure. Such additions may comprise any of numerous metal oxides and metal carbonates, such, for example, as are disclosed in Patents 2,445,003 and 2,699,404.

An improvement in carbon brushes is disclosed in the copending application of Howard M. Elsey, Serial No. 514,319, filed June 9, 1955, reference to which is hereby made, in which a uniform layer having a predetermined thickness and embodying a solid lubricant, such as molybdenum disulfide, is applied across the full width of the leading side of a carbon brush. The solid lubricant functions to prevent excessive wear and dusting of the carbon brush when in sliding contact with the surface of a freshly dressed metallic conducting member.

It has been found that the application of a thin layer embodying molybdenum disulfide to the leading side of a carbon brush, as provided for in the above-mentioned application, reduces entirely the time required for the prefilming operation at ground conditions for most commutators. In certain machines, however, a prefilming operation of an hour or so may be required. It would be desirable to provide a brush with molybdenum disulfide, such that successful operation against any commutator or slip ring is obtained immediately and at any high altitude condition.

The object of this invention is to provide carbon brushes capable of operating with all commutators, having a layer comprising a solid lubricant, such as molybdenum disulfide, disposed across the full width of the leading side of the brush, the layer having a substantially thicker portion extending for only a short distance from the contact surface of the brush.

Another object of this invention is to provide a carbon brush embodying a metal compound additive serving to prolong the life of the brush under adverse conditions and having a layer embodying a solid lubricant, such as molybdenum disulfide, disposed across the full width of the leading side of the brush, the layer having a substantially thicker portion extending for only a short distance from the contact surface of the brush.

Another object of this invention is to provide a carbon brush having a layer of a solid lubricant, such as molybdenum disulfide, disposed across the full width of the leading side of the brush, said layer comprising two portions of different thicknesses, a thick initial operating portion being disposed at and extending for only a short distance from the contact surface of the brush and a relatively thin continuous running portion of substantially uniform thickness extending a substantial distance beyond the thick portion.

Other objects of the invention will, in part, be obvious and will, in part, appear hereinafter. For a better understanding of the nature and objects of the invention, reference should be had to the following detailed description and drawings, in which.

Figure 1:
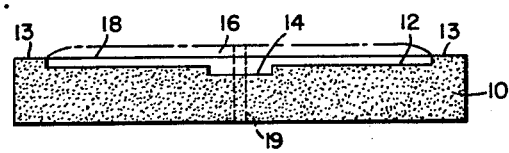
Figure 1 is an end view of a carbon plate showing the grooves milled therein and showing the mixture containing a solid lubricant filling said grooves.

The copending application of Howard M. Elsey, referred to above, discloses a carbon brush having a thin layer disposed at the leading side of a carbon brush, the layer comprising at least 25% by weight of the molybdenum disulfide, the balance ordinarily being some binder, with the thickness of the layer being from 0.005 to 0.03 inch per inch thickness of the brush between the leading side and the trailing side thereof. The thickness of this layer must be controlled in order to avoid any excess of molybdenum disulfide being present.

When a substantially thicker layer embodying a solid lubricant, such as molybdenum disulfide, is disposed along the leading side of a carbon brush, it permits the immediate operation of any dynamoelectric apparatus employing such carbon brush at altitudes of 50,000 feet and higher. However, if a carbon brush having a substantially thicker layer embodying molybdenum disulfide is permitted to operate against the surface of a metallic conducting member for an extended period of time, the surface of the metallic conducting member will roughen and groove, with poor commutation and rapid wear, and dusting of the brush may result. Hence, it is necessary that the thickness of the layer embodying the solid lubricant that is in contact with the surface of the metallic conducting member for long periods of operation be limited so as to apply only a sufficient amount of solid lubricant to insure continuous and satisfactory operation.

I have found that if the layer embodying the molybdenum disulfide be composed of a much thicker initial operating portion disposed at the contact surface of the brush and extending only a short distance upwardly therefrom, with a continuous running portion of a uniform thickness such as set forth in the copending application of Howard M. Elsey, referred to above, extending beyond the thick initial operating portion, then no prefilming operation at ground conditions is necessary in order to operate any dynamoelectric apparatus satisfactorily at altitudes of 50,000 feet and better.

Numerous resinous compounds may be employed as binders for the molybdenum disulfide. Good results have been secured by employing varnishes of phenolic resins, however, numerous other resins, such as furane resins, ureas, melamines and polyester resins which will thermoset and cure when heated, may be employed satisfactorily. The binder may be partly or wholly carbonized.

It is important that the thick initial operating portion of the layer be of sufficient quantity to last for several hours until the contact surface of the metallic conducting member has improved in its cooperation with the brush. After the initial operating period, the thicker portion of the layer has been worn away and thereafter the thin continuous running portion of the layer will apply sufficient molybdenum disulfide to insure continuous and satisfactory operation at a low rate of wear of the brush. I have found that a thickness of the thick initial operating layer of the order of two to four times the thickness of the continuous running portion is sufficient. The height of this initial thicker operating portion should be a few mils, for example 2 to 30 mils, so that it will last long enough to provide lubricating molybdenum disulfide until the metallic conductor member is so improved that it will operate satisfactorily with the substantially smaller amount of molybdenum disulfide imparted by the thin layer. The thicker portion need only last a few hours, for example, up to 10 to 20 hours of running time.

The preferred embodiment of my invention is illustrated by the following example.

As illustrated in Fig. 1, a carbon plate 10 of a thickness of approximately ⅜ inch, a width of 2 inches and a length of 6 inches was milled to provide a shallow groove 12 of a depth of 0.005 inch. The groove 12 was disposed the full length of the carbon plate having a ¼ inch wide ledge 13 on either side thereof. A second groove 14 of a width of ¼ inch and 0.005 inch deep was then milled within this first groove, the full length of the bar. The groove was filled with a layer 16 of paste comprising a mixture of 85 parts by weight of molybdenum disulfide ball milled to colloidal fineness and 115 parts by weight of phenolic varnish. The phenolic varnish comprised 15 parts by weight of a thermosettable phenolformaldehyde resin (the reaction product of one mole of cresol and 1.2 moles of formaldehyde) and 100 parts by weight of a volatile solvent. The plate with the coating of the molybdenum disulfide and phenolic varnish was passed into an oven and baked for sixteen hours at 200° C. The baking drove off the solvent and cured the phenolic resin. The heat treatment decomposed and partly carbonized the phenolic resin, with loss of a portion of the phenolic varnish. The resulting layer comprised 85% of molybdenum disulfide and approximately 15% of cured phenolic binder. The carbon plate with the molybdenum disulfide was then passed under a grinder to remove any excess of molybdenum disulfide layer above line 18 so as to leave only the portion of the layer filling the .005 inch depth of the second groove and the 0.005 inch depth of the original groove. Thereafter, the plate was cut through the center of the bar, as indicated at 19, perpendicular to the applied coating and then the two halves were cut crosswise to provide a plurality of brushes. Each brush was approximately 1 inch long and ½ inch wide across the leading side on which the layer containing molybdenum disulfide was present. After suitably shaping and fitting the contact surface of the brush to the rotating conductor member, the initial operating portion of the layer of a thickness of 10 mils extended up the leading side of the brush approximately ⅟₁₆ inch and the continuous running portion of the layer of a thickness of 5 mils extended beyond the thick initial operating portion for a distance of approximately ½ inch. In fitting the brush against a commutator or slip ring, the contact surface is sanded and the height of the thicker portion will be reduced. For most applications, the thicker portion need be only a few mils high, for instance 5 to 15 mils height will be usually adequate. However, the height of the thicker portion may be adjusted to as little as two or three mils, or to as much as 30 or 40 mils for particular applications.

The brushes were sanded against a slip ring to fit properly thereagainst and the portion having a thickness of 10 mils extended about 15 mils from the contact face. The layer was on the leading edge of the carbon brush. The carbon brushes were operated for many hours in contact with the freshly dressed copper slip ring at 180 amperes per square inch of contact surface in a high altitude chamber at low air pressure conditions corresponding to an altitude of 60,000 feet above sea level. The brush temperature remained at a temperature below 200° C. The brushes operated satisfactorily for hundreds of hours in contact with the slip ring with the average rate of wear of the brush being 0.25 mil per hour running time.

The brush of this preceding example comprised a graphitized carbon body. Other similar brushes were prepared from carbon plates impregnated with 5% by weight of barium fluoride. These functioned against slip rings with a wear rate of less than 0.25 mil per hour.

Figure 2:
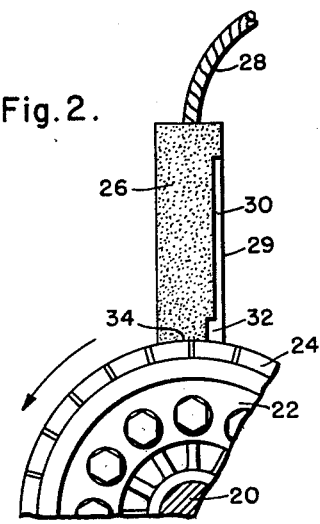
Fig. 2 is a view in elevation, partly in section, of a commutator and a brush associated therewith.

Referring to Fig. 2 of the drawings, there is illustrated a brush corresponding to the preceding example applied to the commutator of a dynamoelectric machine. The dynamoelectric machine comprises a shaft 20 upon which is mounted suitable V-ring supports 22 for retaining commutator segments 24. The shaft 20 turns in a counterclockwise direction, as indicated by the arrow. The brush 26 fitted with a flexible conductor 28 supplying electrical current thereto is affixed to the diameter at its point of contact with the commutator. The leading side of the brush 26 is provided with a layer 29 containing molybdenum disulfide comprising a thin continuous running portion 30 and a thicker initial operating portion 32. A contact surface 34 of the brush operates against the commutator segments 24. In initial operation, the relative rotation of the commutator segments 24 against the brush 26 causes large quantities of the molybdenum disulfide from the thick initial operating portion 32 of the layer 29 to be wiped or rubbed onto the commutator segments over the full width of the brush. The molybdenum disulfide so rubbed on provides the necessary lubrication to operate the carbon brush against clean copper, such as is present in a freshly dressed commutator without the necessity of a prefilming operation at ground conditions. After the initial operating portion 32 of the layer has worn away, the molybdenum disulfide present in the continuous running portion 30 of the layer 29 is rubbed onto the commutator segments and provides the necessary lubrication to insure continuous satisfactory operation at a low rate of wear of the brush.

Figures 3, 4:
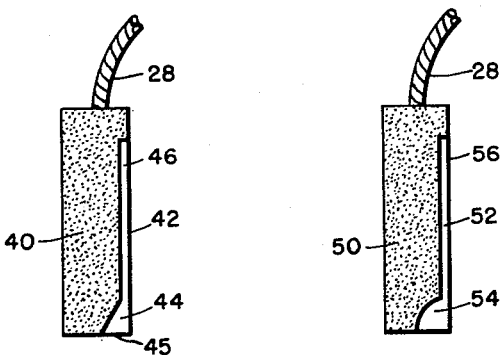
Figs. 3 and 4 are views in elevation of other forms of carbon brushes prior to the tapering of the contact surface.

Fig. 3 shows another form of carbon brush before fitting to the contact surface wherein the brush 40 having a flexible connection 28 attached thereto has a layer 42 comprising molybdenum disulfide disposed across the full width of the leading side of the brush and having a tapered thicker initial operating portion 44 having an extra thick face 45 disposed at the contact surface and a thin continuous running portion 46 extending beyond the thick initial operating portion. This tapered thick construction has the advantage of providing the maximum molybdenum disulfide at the very start of use with reduced amounts being applied to a commutator as the brush wears slowly during use. The face 45 may be 4 to 6 times as thick as the portion 46.

Fig. 4 also shows a further modified form of carbon brush before fitting to the contact surface, wherein the brush 50 having a flexible connection 28 attached thereto has a layer 52 comprising molybdenum disulfide disposed across the full width of the leading side of the brush. The layer 52 comprises an arcuate progressively reduced thick initial operating portion 54 disposed at the contact surface terminating in a thin continuous running portion 56 extending beyond the thick initial operating portion.

The layer comprising molybdenum disulfide having portions of two different thicknesses as disclosed in this invention can be applied to any type of carbon brush. As is well known, carbon brushes may comprise carbon alone or admixed with graphite or the carbon be entirely converted to graphite by a suitable graphitizing treatment. The carbon may contain a substantial portion of a metal, such as copper, silver or the like.

The molybdenum disulfide layer having portions of two different thicknesses may also be applied to a carbon brush containing from 0.5% to 50% by weight of a metal compound serving to prolong the life of the brush under conditions of low water vapor and oxygen pressure, such as occur at extreme altitudes. As disclosed in Patent 2,414,514 to Howard M. Elsey, and assigned to the same assignee as the present application, carbon brushes may be prepared by impregnating them or otherwise incorporating throughout the body of the carbon brush a metal halide, such, for example, as lead iodide, lead bromide, lead chloride, lead fluoride, calcium fluoride, barium fluoride, and the like. In many cases, from 2% to 10% of the weight of the carbon brush may comprise the metal halide. Likewise, carbon brushes containing an admixture of metal oxides and metal carbonates, such, for example, as lithium carbonate, barium oxide, strontium oxide, barium carbonate and magnesium carbonate, may be advantageously provided with the layer of molybdenum disulfide having portions of two different thicknesses.

While molybdenum disulfide has been specifically described as the solid lubricant used in this invention, it will be understood that other solid lubricants may be employed. Other solid lubricants suitable for the practice of the present invention comprise at least one selected from the group consisting of the disulfides, diselenides and ditellurides of molybdenum, tungsten, titanium and zirconium. Examples of such solid lubricants other than molybdenum disulfide are molybdenum diselenide, molybdenum ditelluride, tungsten disulfide, titanium disulfide and zirconium disulfide.

The molybdenum disulfide or other solid lubricant employed in practicing this invention is a highly purified material substantially free from abrasives. Ordinarily, the molybdenum disulfide will be finely divided, preferably of a fineness to pass through a sieve having 200 meshes to the linear inch. Good results have been secured using molybdenum disulfide which was ball milled for several hours whereby it is reduced to a fineness such that the average particle size is less than 5 microns in diameter. Mixtures of molybdenum disulfide and tungsten disulfide, for instance, may be employed with satisfactory results.

It will be understood that the description and drawings are exemplary.

I claim as my invention:

1. An electrical contact brush suitable for operating satisfactorily in sliding contact with a freshly dressed metallic conducting member under extreme atmospheric conditions, comprising a body of carbon and a layer disposed across the full width of the leading side of the brush substantially at right angles to the direction of relative sliding movement of the brush to the conducting surface, the layer comprising molybdenum disulfide in an amount of at least 25% of the weight of the layer, said layer comprising a thick initial operating portion disposed at the contact surface of the brush and a thin continuous running portion extending a substantial distance beyond the thick initial operating portion, said thin continuous running portion being substantially uniform from edge to edge of the brush and being of a thickness not exceeding 0.08 inch per inch thickness of the brush between the leading side and trailing side of the brush, the thick initial operating portion being substantially uniform from edge to edge of the brush and being of a thickness of at least two to four times the thickness of the continuous running layer and extending upwardly from the contact surface of the brush in contact with the sliding surface of the metallic conducting member a sufficient distance to provide enough molybdenum disulfide to last until the contact surface of the metallic conducting member has so improved in its cooperation with the brush that the thin continuous running portion will then be able to apply sufficient molybdenum disulfide to insure continuous satisfactory operation at a low wear rate of the brush.

2. The electrical contact brush of claim 1, wherein at least a part of the molybdenum disulfide is replaced by at least one solid lubricant compound selected from the group consisting of the disulfides, diselenides, and ditellurides of molybdenum, tungsten, titanium and zirconium.

3. The electrical contact brush of claim 1, wherein the carbon portion of the body has admixed therein an amount of from 0.5% to 50% of the weight of the body of at least one metal compound serving to prolong the life of the brush under conditions of low water vapor and oxygen pressure, the compound selected from the group consisting of the halides, oxides and carbonates of a metal.

4. An electrical contact brush suitable for operating satisfactorily in sliding contact with a freshly dressed metallic conducting member under extreme atmospheric conditions comprising a body of carbon and a layer disposed across the full width of the brush substantially at right angles to the direction of relative sliding movement of the brush to the conducting surface, said layer comprising a thick initial operating portion disposed at the contact surface of the brush, and a thin continuous running portion not exceeding 0.08 inch per inch thickness of the brush and having at least half the thickness of the thick initial operating portion extending a substantial distance beyond the thick initial operating portion, and the layer comprising molybdenum disulfide in an amount of at least 25% of the weight of the layer, said thick initial operating portion having a height of not in excess of 1/16 inch and supplying sufficient molybdenum disulfide to enable the brush to operate satisfactorily in contact with a freshly dressed metallic conducting member and with a moderate wear rate of the brush, the thick initial operating portion being sufficient to last until the contact surface of the metallic conducting member has improved in its cooperation with the brush so that the thin continuous running portion will then be able to apply sufficient molybdenum disulfide to insure continuous satisfactory operation at a low wear rate of the brush.

No references cited.